(12) United States Patent
King

(10) Patent No.: US 8,762,544 B2
(45) Date of Patent: Jun. 24, 2014

(54) SELECTIVELY COMMUNICATING DATA OF A PERIPHERAL DEVICE TO PLURAL SENDING COMPUTERS

(75) Inventor: James M. King, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 191 days.

(21) Appl. No.: 13/142,685

(22) PCT Filed: Jan. 29, 2009

(86) PCT No.: PCT/US2009/032377
§ 371 (c)(1),
(2), (4) Date: Jun. 29, 2011

(87) PCT Pub. No.: WO2010/087829
PCT Pub. Date: Aug. 5, 2010

(65) Prior Publication Data
US 2011/0283002 A1    Nov. 17, 2011

(51) Int. Cl.
G06F 15/16    (2006.01)

(52) U.S. Cl.
USPC .......................................... 709/227; 709/228

(58) Field of Classification Search
USPC ............ 709/227, 203, 217, 219, 228; 703/23, 703/24, 25; 710/7, 8, 10
See application file for complete search history.

(56) References Cited

U.S. PATENT DOCUMENTS

| | | | |
|---|---|---|---|
| 6,895,588 B1* | 5/2005 | Ruberg | .......................... 719/321 |
| 2002/0059372 A1 | 5/2002 | Goshev et al. | |
| 2003/0005163 A1 | 1/2003 | Belzile | |
| 2006/0020702 A1 | 1/2006 | England et al. | |
| 2006/0075106 A1* | 4/2006 | Hochmuth et al. | ........... 709/227 |
| 2008/0082639 A1 | 4/2008 | Hochmuth et al. | |
| 2008/0320500 A1 | 12/2008 | Li et al. | |

FOREIGN PATENT DOCUMENTS

| | | |
|---|---|---|
| CN | 1551592 A | 12/2004 |
| CN | 1669015 A | 9/2005 |
| CN | 1910566 A | 2/2007 |
| CN | 101258478 A | 9/2008 |

OTHER PUBLICATIONS

King, James M., Notification of Transmittal of the International Search Report and the Written Opinion of the International Searching Authority, or the Declaration, PCT International Application No. PCT/US2009/032377 filed Jan. 29, 2009, Date of Mailing: Oct. 28, 2009, 11 pages.

(Continued)

*Primary Examiner* — Yamane Mesfin
*Assistant Examiner* — Jeff Banthrongsack

(57) ABSTRACT

A network arrangemen includes a receiving computer connected over a network to plural sending computers. A first session is established between the receiving computer and a first of the plural sending computers, where the first session involves providing data of a peripheral device attached to the receiving computer to the first sending computer, and where the data of the peripheral device is provided to a first device driver of the peripheral device in the first sending computer. A second session is established between the receiving computer and a second of the plural sending computers, where the second session involves providing the data of the peripheral device attached to the receiving computer to the second sending computer, and where the data of the peripheral device is provided to a second device driver of the peripheral device in the second sending computer.

17 Claims, 2 Drawing Sheets

(56) References Cited

OTHER PUBLICATIONS

State Intellectual Property Office of People's Republic of China. Search Report, Application No. 2009801557518, Filing Date: Jan. 29, 2009.

Yang, et al. Research and Implementation based on Grid-enabling of Computer Peripheral, Institute of Computing Technology, Chinese Academy of Sciences. Beijing 10080, China.

* cited by examiner

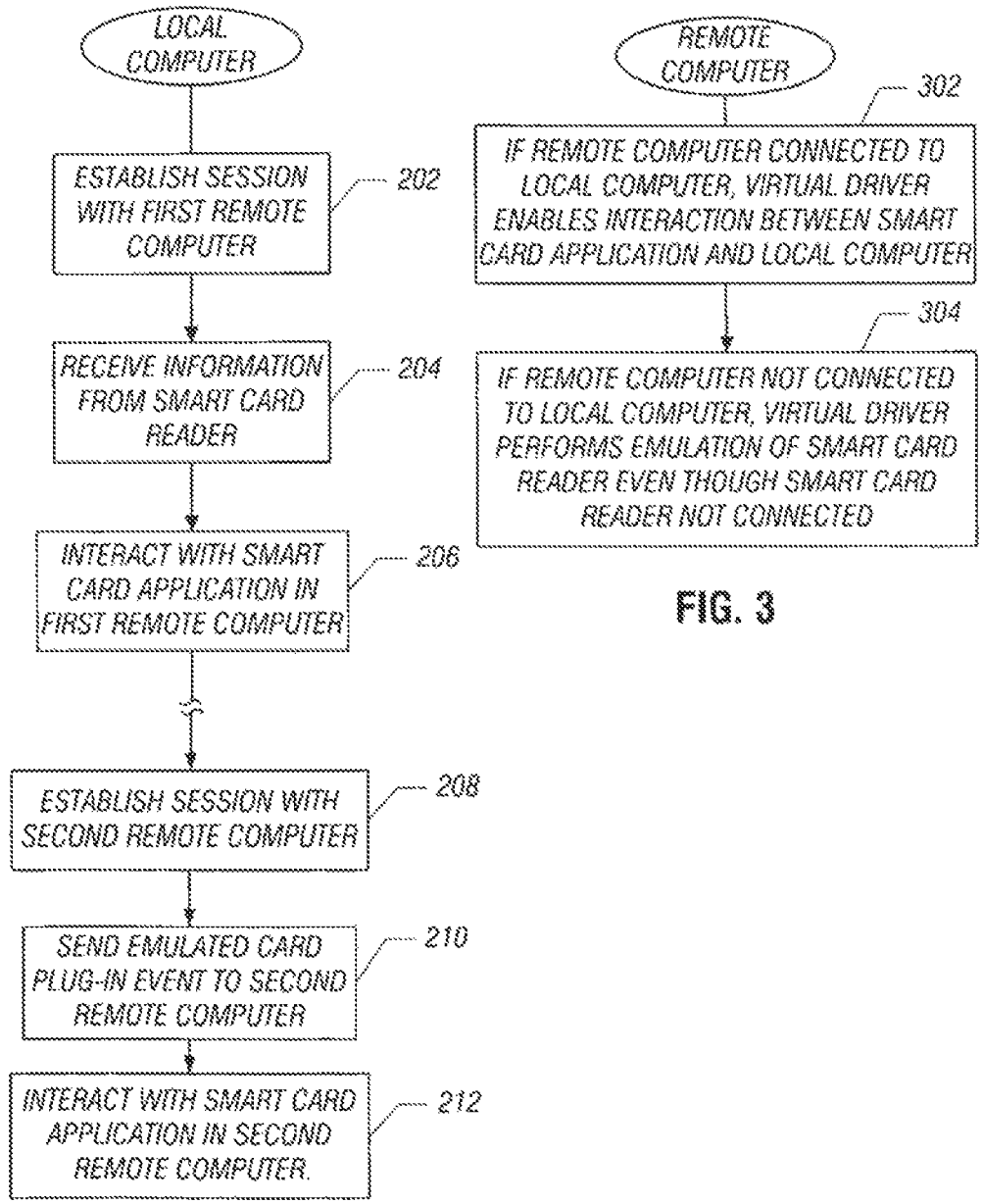

SELECTIVELY COMMUNICATING DATA OF A PERIPHERAL DEVICE TO PLURAL SENDING COMPUTERS

BACKGROUND

Many enterprises are transitioning to a network arrangement in which computing resources of central servers are provided to local computers at which users are located. The computing resources (e.g., software applications, processing resources, storage resources, etc.) that are centralized at one or more central servers can be selectively allocated to a session established by a user at a local computer.

Protocols are provided to enable a user at a local computer to access and share the desktop of a remote computer (e.g., a central server) over a computer network. One such protocol is the Remote Desktop Protocol (RDP), as provided by Microsoft Corporation, to provide remote display and input capabilities over network connections. Another protocol that can be used is the Remote Graphics Software (RGS) protocol from the Hewlett Packard Co. RGS is designed to take full advantage of the computer and graphics resources of a remote computer to deliver interactive remote access at the local computer. The desktop video data of the remote computer is transmitted over the network to the local computer, which displays the desktop video data locally in a window at the local computer. RGS is designed to provide fast capture, compression, and transmission of a desktop video data over a network. RGS also allows audio data to be sent from the remote computer to the local computer for output on an audio device of the local computer. RGS also captures user keyboard and mouse inputs at the local computer, and sends the keyboard and mouse inputs to the remote computer for processing by the operating system of the remote computer, and by applications running on the remote computer. RGS also allows data of other peripheral devices (e.g., such as storage devices) to be communicated from the local computer to the remote computer.

When connecting a local computer to multiple remote computers, multiple duplicate peripheral devices may have to be attached to the local computer for use with the corresponding remote computers. Use of duplicate peripheral devices increases the number of hardware devices that have to be attached to the local computer, and can lead to increased complexity and costs.

BRIEF DESCRIPTION OF THE DRAWINGS

Some embodiments of the invention are described, by way of example, with respect to the following figures:

FIG. 2 is a flow diagram of a process performed at the local computer, in accordance with an embodiment; and FIG. 3 is a flow diagram of a process perthrmed at the remote computer, in accordance with an embodiment.

DETAILED DESCRIPTION

Figure 1:
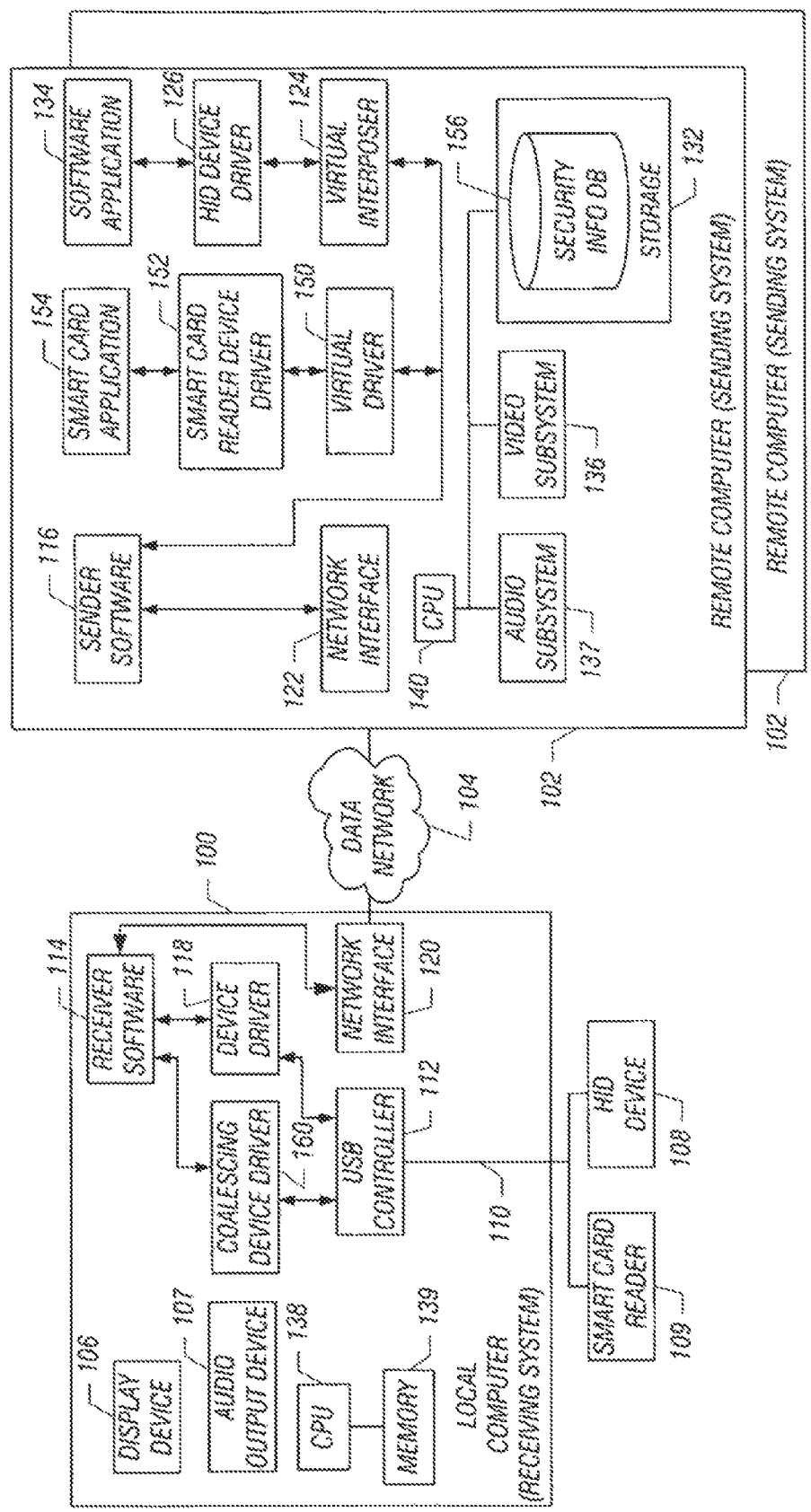
FIG. 1 is a block diagram of an exemplary arrangement that includes a local computer and remote computer, in which an embodiment of the invention can be incorporated.

FIG. 1 illustrates an arrangement in which a local computer 100 (at which a user is located) is able to connect to one of multiple remote computers 102 over a data network 104. Although just one local computer 100 and two remote computers 102 are depicted in FIG. 1, it is noted that there can be multiple local computers 100 and more than two remote computers 102.

The local computer 100 is able to use the resources of a remote computer 102 in sessions established between the local computer 100 and the remote computer 102. For example, the local computer 100 can use the graphics resources of the remote computer 102, in which the remote computer 102 delivers desktop video data of the remote computer over the network 104 to the local computer 100 for display in a display device 106 of the local computer 100. Also, the local computer can use audio resources of the remote computer 102, in which the remote computer 102 delivers audio data of the remote computer over the network 104 to the local computer 100 for output by an audio output device 107 (e.g., headphone, speakers, etc.) of the local computer 100.

Also, one or more user interface devices 108 are attached to the local computer 100. Changes in the state of the user interface device 108 are communicated from the local computer 100 over the data network 104 to the remote computer 102. The user intertke device 108 can be a human interface device (HID) according to the HID standard, as described in Universal Serial Bus (USB), Device Class Definition For Human Interface Devices (HID), Firmware Specification, Version 1.11, dated Jun. 27, 2001. The HID device 108 can be a mouse, a keyboard, a roller ball-type input device, a tablet, and so forth.

FIG. 1 also shows another input peripheral device 109 attached to the local computer 100. In the example shown, the input peripheral device 109 can be a smart card reader for accepting smart cards that contain user security information to allow the user to access the local computer 100 and one of the multiple remote computers 102. A smart card contains a storage device to store the user security information. When the smart card is inserted, into the smart card reader 109, the smart card reader 109 retrieves the security information from the smart card and provides the security information to the local computer 100. In turn, the local computer 100 provides the security information to a selected one of the remote computers 102 that the user wishes to access for the selected remote computer 102 to determine whether the user is allowed access.

In accordance with some embodiments, the smart card reader 109 is useable with multiple remote computers 102, such that the smart card reader 109 does not have to be duplicated—one smart card reader for each corresponding remote computer 102. The ability to use one smart card reader 109 with multiple remote computers 102 enhances efficiency and avoids duplication of hardware. In this way, it is possible for one smart card reader 109 to be concurrently connected to multiple remote computers 102. Each such remote computer 102 sees a virtual image of the smart card reader 109.

The remote computers 102 include respective virtual drivers 150 for emulating the smart card reader 109. The virtual driver 150 interacts with a smart card reader device driver 152 in each corresponding remote computer 102. A smart card software application 154 is provided in each remote computer 102 to provide the security tasks associated with the smart card reader 109. For example, the smart card software application 154 can send pollin requests to the smart card reader device driver 152 to obtain any data that may have been read by the smart card reader 109 from a smart card. The polling requests are forwarded by the smart card reader device driver 152 to the virtual driver 150, which in turn sends the pollina requests over the network 102 to the local computer 100 through various intervening components (described further below).

By emulating the smart card reader 109 using he virtual driver 150 in each remote computer 102, an actual smart card reader does not have to be provided at the remote computer. One or multiple remote computers 102 can be connected to the local computer 100 at any given time. Thus, one smart card reader 109 can be made to appear as multiple virtual devices at the remote computers that are connected to the local computer 100. It is noted that one or more other remote computers 102 may not be connected to the local computer at that given time, and an the smart card applications 154 in such other remote computers 102 would not be able to access the smart card reader 109 attached to the local computer 100. As a result, the virtual drivers 150 in such other remote computers 102 would have to emulate the presence of the smart card reader 109 even though such other remote computers are not connected to the local computer 100. Emulating the presence of the smart card reader 109 involves the virtual driver 150 sending back responses to requests from the smart card application 154 even though the smart card reader 109 is not currently accessible. The responses sent by the virtual driver 150 can be responses indicatin that no new data has been received by the smart card reader 109.

Alternatively, instead of sending polling requests from the smart card application 154, the smart card application 154 can wait for an input event from the smart card reader 109, where the input event indicates that a smart card has been inserted into the smart card reader 109.

Security information received from the smart card reader 109 by the smart card application 154 is compared with security information in a security information database 156 stored in a storage 132 of the remote computer 102. The security information database 156 stores security information for multiple users that are authorized to access the remote computer 102.

In other implementations, instead of a smart card reader, the input peripheral device 109 can be another type of input security device (e.g., keypad to enter a security code, etc.) to control user access of the local computer 100 and remote computers 102. In yet other implementations, the input peripheral device 109 can be other types of peripheral devices, such as a USB headphone. The user may wish that an image of the USB headphone appear at each of two remote computers.

The local computer 100 includes a coalescing device driver 160 that interacts with the smart card reader 109. The "coalescing" device driver 160 is a device driver that is able to selectively establish different sessions with selected different ones of the remote computers 102 for sending smart card data to the selected remote computer 102. For example, a user may desire to connect to different remote computers 102. The coalescing device driver 160 is able to exchange information (data and control information) with a respective smart card device driver 152 in the selected remote computer 102. The coalescing device driver 160 allows for interaction between the smart card application 154 (in the connected remote computer 102) and the smart card reader 109 (in the local computer 100) over the network 104. In addition, when the local computer 100 is connected to multiple remote computers 102, the coalescing device driver 160 is able to coalesce multiple calls from the remote computers. For example, if the input peripheral device 109 is a USB headphone, the coalescing driver 109 can mix audio data from multiple remote computers into one stream for output at the USB headphone. On the other hand, if the input peripheral device 109 is a smart card reader, then the coalescing driver 109 can perform more intelligent functions, including providing cache memory to store certain information.

The data network 104 can communicate data according to the Internet Protocol (IP). The HID device 108 and smart card reader 109 can be attached to the local computer 100 over Universal Serial Bus (USB) link(s) 110 (wired or wireless USB link) to a USB controller 112 in the local computer 100. In the above-described implementation, any data relating to the HID device 108 or smart card reader 109 is in the form of USB data that is communicated in IP packets transferred over the data network 104 to the remote computer 102. Although reference is made to "USB" and "IP" in the embodiments described, it is noted that techniques according to some embodiments can be applicable to data packets according to other types of protocols.

The local computer 100 is referred to as a "receiving system," and each remote computer 102 is referred to as a "sending system." As such, the local computer 100 includes receiver software 114, and the remote computer 102 includes sender software 116. The sender software 116 is used for sending desktop video data and audio data of the remote computer 102 (sending system) over the data network 104 to the receiver software 114 in the local computer 100 (receiving system), where the desktop video data is displayed at the display device 106, and the audio data is output by the audio output device 107. Note that the desktop video data and audio data sent by the sender software 116 is actual rendering video data and rendering audio data that can be rendered by a respective display device and audio output device. The rendering video data and rendering audio data are different from data contained in source video files (e.g., MPEG files) or source audio files that have to be converted to a format that can be rendered by respective output devices.

The sender software 116 in the remote computer 102 receives video data from a video subsystem 136 in the remote computer 102. The video data of the video subsystem 136 is displayable by a display device attached to the remote computer 102. The sender software 116 then applies compression to the video data that is sent to the receiver software 114, which can then perform decompression of the video data before displaying the video data at the display device 106.

Similarly, the sender software 116 receives audio data fipm an audio subsystem 137 in the remote compute 102. The audio data of the audio subsystem 137 can be output by an audio output device attached to the remote computer 102. The sender software 116 also applies compression to the audio data that is sent to the receiver software 114, which can then perform decompression of the audio data before outputting the audio data at the audio output device 107.

Note that an actual display device or audio output device does not have to be connected to the video subsystem 136 or audio subsystem 137 of the remote computer 102 in some implementations; however, in other implementations, a display device or audio output device can be connected to the remote computer 102.

In some embodiments, the sender software 116 and receiver software 114 are according to the Remote Graphics Software (RGS) protocol from the Hewlett-Packard Co. RGS is designed to take full advantage of computer and graphics resources of a remote computer to deliver interactive remote access from a local computer. In a different embodiment, the sender software 116 and receiver software 114 can operate according to the Remote Desktop Protocol (RDP) from Microsoft Corporation, to provide remote display and input capabilities over network connections. In further embodiments, the sender software 116 and receiver software 114 can be according to other technologies.

The coalescing device driver 160 interacts with the USB controller 112 to perform operations with respect to the smart card reader 109. In addition, a device driver 118 in the local computer 100 interacts with the USB controller 112 to perform operations with respect to the HID device 108. For example, the device driver 118 can receive indications of change of the HID device 108 (such as when a user has moved a mouse, actuated a keyboard, moved a roller ball-type input device, moved an input device relative to a tablet, and so forth).

The data sent between the local computer 100 and remote computer 102 (including HID device data and smart card data) is provided through network interfaces 120 and 122 in the local computer 100 and remote computer 102, respectively. Each of the network interfaces 120 and 122 includes a physical network interface controller as well as a protocol stack, including an IP protocol stack. The network interface 120 sends USB data (smart card data and/or HID data) in respective IP packets over the data network 104 to the remote computer 102. The IP packets are received by a network interface 122 in the remote computer 102, which extracts the USB smart card data and/or HID data from the IP packets.

Smart card data received from the receiver software 114 at the sender software 116 is forwarded to the virtual driver 150, which in turn sends the smart card data to the smart card reader device driver 152 for forwarding to the smart card application 154.

HID device data received at the sender software 116 is forwarded to a virtual interposer 124. The virtual interposer 124 intercepts calls from an HID device driver 126 in the remote computer 102 that are intended for the remotely located the HID device 108 attached to the local computer 100. The virtual interposer 124 prevents calls to the remotely located peripheral devices from reachiniz lower level (kernel) device drivers of the operating system in the remote computer 102.

Other device drivers (not shown) in each remote computer 102 can create audio data and video data that are provided to the audio subsystem 137 and video subsystem 136, respectively, to be rendered by respective output devices, such as respective output device connected to the local computer 100 and the remote computer 102.

The remote computer 102 also includes one or more software applications 134. One software application 134 may receive and process updated information from the HID device 108.

The local computer 100 includes one or more central processing units (CPUs) 138, which is connected to memory 139. The software modules of the local computer 100, such as the receiver software 114 and device drivers 118, are executable on the CPU(s) 138.

The remote computer 102 similarly includes one or more CPUs 140 connected to the storage 132. The software modules of the remote computer 102, such as the software application(s) 134, device driver 126, virtual interposer 124, virtual driver 150, smart card reader device driver 152, smart card application 154, and sender software 116 are executable on the CPU(s) 140.

FIG. 2 illustrates a procedure performed by a local computer 100. The local computer 100 establishes (at 202) a connection (or session) with a first remote computer 102. Establishing such connection involves the receiver software 114 establishing the connection with the respective sender software 116 of the first remote computer 102.

After the connection with the first remote computer 102 has been established, the coalescing device driver 160 in the local computer 100 receives (at 204) information from the smart card reader 109, such as an indication that a smart card has been inserted into the smart card reader 109. The received information (e.g., user security credentials) can be cached by the coalescing driver 160 (for future use). The coalescing device driver 160 then interacts (at 206) with the smart card application 154 of the first remote computer 102 to perform tasks with respect to the smart card reader 109.

Later, the local computer 100 establishes (at 208) another connection (or session) with a second remote computer 102. After connection with the second remote computer 102, the coalescing software 160 is aware that it remains connected to the smart card reader 109. The coalescing software 160 sends (at 210) an emulated card plug-in event to the second remote computer 102 to indicate to the second remote computer that a smart card has been received at the smart card reader 109. Note that the coalescing driver 160 has cached the user security credential, which can be provided to the second remote computer 102 upon request. The coalescing device driver 160 then interacts (at 212) with the smart card application 154 of the second remote computer 102 to perform tasks with respect to the smart card reader 109.

If a smart card is later removed from the smart card reader 109, the coalescing driver 160 is able to send a smart card removal event to all connected remote computers.

FIG. 3 illustrates a procedure according to an embodiment that is performed at the remote computer 102. If the virtual driver 150 detects that the remote computer 102 is connected to the local computer 100, then the virtual driver 150 enables (at 302) interaction between the smart card application 154 in the remote computer 102 and the smart card reader 109 attached to the local computer 100.

However, if the virtual driver 150 detects that the remote computer 102 is not connected to the local computer 100, then the virtual driver 150 performs (at 304) emulation of the smart card reader to emulate presence of the smart card reader even though the smart card reader is not connected. In its emulation mode, the virtual driver 150 handles requests from the smart card application 154 and provides responses to such requests. Note that in some other instances, the virtual driver 150 can choose to stop emulating the smart card reader if the smart card reader is not connected.

Instructions of software described above (including the receiver software 114, coalescing driver 160, device driver 118, sender software 116, virtual driver 150, smart card reader device driver 152, virtual interposer 124, and device driver 126 of FIG. 1) are loaded for execution on a processor (such as one or more CPUs 139, 140 in FIG. 1). The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a network arrangement including a receiving computer connected over a network to plural sending computers, comprising:
    establishing a first session between the receiving computer and a first of the plural sending computers, wherein the first session involves providing data of a peripheral device attached to the receiving computer to the first sending computer, wherein the data of the peripheral device is provided to a first device driver of the peripheral device in the first sending computer; and
    establishing a second session between the receiving computer and a second of the plural sending computers, wherein the second session involves providing the data of the peripheral device attached to the receiving computer to the second sending computer, wherein the data of the peripheral device is provided to a second device driver of the peripheral device in the second sending computer,
    wherein establishing the first and second sessions comprises establishing the first and second sessions in which communication occurs between the receiving computer and virtual drivers in the first and second sending computers, wherein the virtual drivers are to emulate the peripheral device in the corresponding first and second sending computers.

2. The method of claim 1, wherein the first and second device drivers are to interact with the respective virtual drivers in the first and second sending computers, wherein the virtual driver in the first computer provides the data of the peripheral device to the first device driver, and wherein the virtual driver in the second computer provides the data of the peripheral device to the second device driver.

3. The method of claim 1, wherein establishing the first and second sessions comprises establishing the first and second sessions in which communication occurs between a coalescing driver in the receiving computer and corresponding first and second sending computers, wherein the coalescing driver is able to selectively communicate with different ones of the first and second sending computers.

4. The method of claim 1, further comprising:
    the receiving computer remotely accessing a resource in each of the plural sending computers over the network; and
    the receiving computer sending received user input at a user input device attached to the receiving computer to a user input device driver in one of the plural sending computers.

5. The method of claim 4, wherein remotely accessing the resource comprises remote accessing a video resource in which rendering video data is sent from one of the remote computers to the receiving computer.

6. The method of claim 1, wherein providing the data of the peripheral device in the first and second sessions comprises providing data of an input security device.

7. The method of claim 1, wherein providing the data of the peripheral device in the first and second sessions comprises providing data of a smart card reader.

8. The method of claim 1, wherein providing the data of the peripheral device in the first and second sessions comprises providing data of a Universal Serial Bus (USB) device.

9. A first computer comprising:
    a processor;
    a virtual driver executable on the processor to emulate a peripheral device connected to a second computer connected to the first computer over a network; and
    sender software executable on the processor to selectively establish a connection between the first computer and the second computer, wherein:
        if the first computer is connected to the second computer, the virtual driver enables interaction between a software application in the first computer and a peripheral device attached to the second computer, and
        if the first computer is not connected to the second computer, the virtual driver behaves as an emulator of the peripheral device attached to the second computer to emulate presence of the peripheral device even though the peripheral device is not accessible.

10. The first computer of claim 9, wherein the virtual driver is to emulate an input security device.

11. The first computer of claim 9, further comprising a device driver to receive an update regarding a user interface device attached to the second computer, and a video subsystem to store rendering video data for output on a display device, wherein the sender software is executable to send the rendering video data to the second computer for display at the second computer.

12. An article comprising at least one non-transitory computer-readable storage medium containing instructions that when executed cause a receiving computer to:
    selectively establish, over a network, sessions with different ones of plural sending computers;
    send data of an input peripheral device, from a coalescing device driver in the receiving computer, to a first one of the plural sending computers when a session is established between the receiving computer and the first sending computer, wherein the input peripheral device is attached to the receiving computer, and wherein the data of the input peripheral device is provided to a first virtual driver for communication to a first device driver of the input peripheral device in the first sending computer; and
    send the data of the input peripheral device, from the coalescing device driver, to a second one of the plural sending computers when a session is established between the receiving computer and the second sending computer, wherein the data of the input peripheral device is provided to a second virtual driver for communication to a second device driver of the input peripheral device in the second sending computer, wherein the first and second virtual drivers are to emulate, in the corresponding first and second sending computers, the input peripheral device attached to the receiving computer.

13. The article of claim 12, wherein the input peripheral device is attached to the receiving computer by a Universal Serial Bus link.

14. The method of claim 1, wherein providing the data of the peripheral device to the first sending computer comprises providing the data of the peripheral device to a first sender software in the first sending computer, the first sender software distinct from the first device driver and configured to send the data of the peripheral device to the first device driver, and wherein providing the data of the peripheral device to the second sending computer comprises providing the data of the peripheral device to a second sender software in the second sending computer, the second sender software distinct from the second device driver and configured to send the data of the peripheral device to the second device driver.

15. The first computer of claim 9, further comprising a device driver of the peripheral device attached to the second computer, wherein the virtual driver is to receive data of the peripheral device from the second computer, and to provide the data of the peripheral device to the device driver, and wherein the device driver is to forward the data of the peripheral device to the software application in the first computer.

16. The article of claim 12, wherein sending the data of the first peripheral device to the first sending computer or the second sending computer comprises sending the data of the input peripheral device to a first of the virtual drivers in the first sending computer or a second of the virtual drivers in the second sending computer, respectively.

17. The article of claim 12, wherein sending the data of the input peripheral device to the first sending computer comprises sending the data of the input peripheral device to a first sender software in the first sending computer, the first sender software distinct from the first device driver and configured to provide the data of the input peripheral device to the first virtual driver, and wherein sending the data of the input peripheral device to the second sending computer comprises sending the data of the input peripheral device to a second sender software in the second sending computer, the second sender software distinct from the second device driver and configured to provide the data of the input peripheral device to the second virtual driver.

* * * * *